(12) United States Patent
Biswal et al.

(10) Patent No.: US 9,212,285 B2
(45) Date of Patent: Dec. 15, 2015

(54) ELECTRONICALLY CONDUCTING CARBON AND CARBON-BASED MATERIAL BY PYROLYSIS OF DEAD LEAVES AND OTHER SIMILAR NATURAL WASTE

(71) Applicant: COUNCIL OF SCIENTIFIC & INDUSTRIAL RESEARCH, New Delhi (IN)

(72) Inventors: Mandakini Biswal, Maharashtra (IN); Abhik Banerjee, Maharashtra (IN); Satishchandra Balkrishna Ogale, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/377,215

(22) PCT Filed: Feb. 8, 2013

(86) PCT No.: PCT/IN2013/000086
§ 371 (c)(1),
(2) Date: Aug. 7, 2014

(87) PCT Pub. No.: WO2013/118150
PCT Pub. Date: Aug. 15, 2013

(65) Prior Publication Data
US 2015/0004415 A1    Jan. 1, 2015

(30) Foreign Application Priority Data

Feb. 8, 2012  (IN) .......................... 0357/DEL/2012
May 22, 2012 (IN) .......................... 1560/DEL/2012

(51) Int. Cl.
| | |
|---|---|
| C09C 1/48 | (2006.01) |
| C01B 31/02 | (2006.01) |
| C01B 31/08 | (2006.01) |
| B82Y 30/00 | (2011.01) |
| B82Y 40/00 | (2011.01) |

(52) U.S. Cl.
CPC . *C09C 1/48* (2013.01); *B82Y 30/00* (2013.01); *B82Y 40/00* (2013.01); *C01B 31/02* (2013.01); *C01B 31/0206* (2013.01); *C01B 31/081* (2013.01); *Y10T 428/2982* (2015.01)

(58) Field of Classification Search
CPC ...... C09C 1/48; C01B 31/02; C01B 31/0206; C01B 31/081; B82Y 30/00; B82Y 40/00; Y10T 482/2982
USPC ........ 428/402; 252/503; 423/449.8; 502/180, 502/437
See application file for complete search history.

(56) References Cited

U.S. PATENT DOCUMENTS

2003/0161781 A1* 8/2003 Cabasso et al. ............... 428/402

OTHER PUBLICATIONS

A. F. Dmitruk et al: "Preparation and Properties of Porous Carbon Materials Based on Fallen Leaves" Solid Fuel Chemistry, vol. 41, No. 5, Oct. 2007, pp. 302-306, XP002698912.*
K. Kulkarni, et al : "UV Photoactivation of Nano/Micro Porous Plant-Derived Carbon and . . . " International Journal of Green Nanotechnology, vol. 3, No. 4, Dec. 16, 2011, pp. 292-301, XP002698913.*
Dmitruk, et al, "Preparation and Properties of Porous Carbon Materials Based on Fallen Leaves" Solid Fuel Chemistry, 41(5):302-306 (2007).
Kulkarni et al, "UV Photoactivation of Nano/Micro Porous Plant-Derived Carbon and Application to CO2 Gas Adsorption" International Journal of Green Nanotechnology, 3(4):292-301 (2011).
Plaza et al. "Evaluation of ammonia modified and conventionally activated biomass based carbons as CO2 adsorbents in postcombustion conditions" Separation and Purification Technology, 80:96-104 (2011).
Li et al, "Nitrogen-containing carbon spheres with very large uniform mesopores: The superior electrode materials for EDLC in organic electrolyte" Carbon, Elsevier, Oxford, GB, 45(9):1757-1763 (2007).

* cited by examiner

*Primary Examiner* — Leszek Kiliman
(74) *Attorney, Agent, or Firm* — Drinker Biddle & Reath LLP

(57) ABSTRACT

The present invention disclosed herein is carbon nanomaterial and carbon based nanocomposites by pyrolysis of dead leaves and other similar natural waste material. In particular, the invention relates to synthesis of valuable functional carbon materials and their nanocomposites from different waste materials such as plant dead leaves and their use in high value added product applications.

11 Claims, 10 Drawing Sheets

Figure: 1
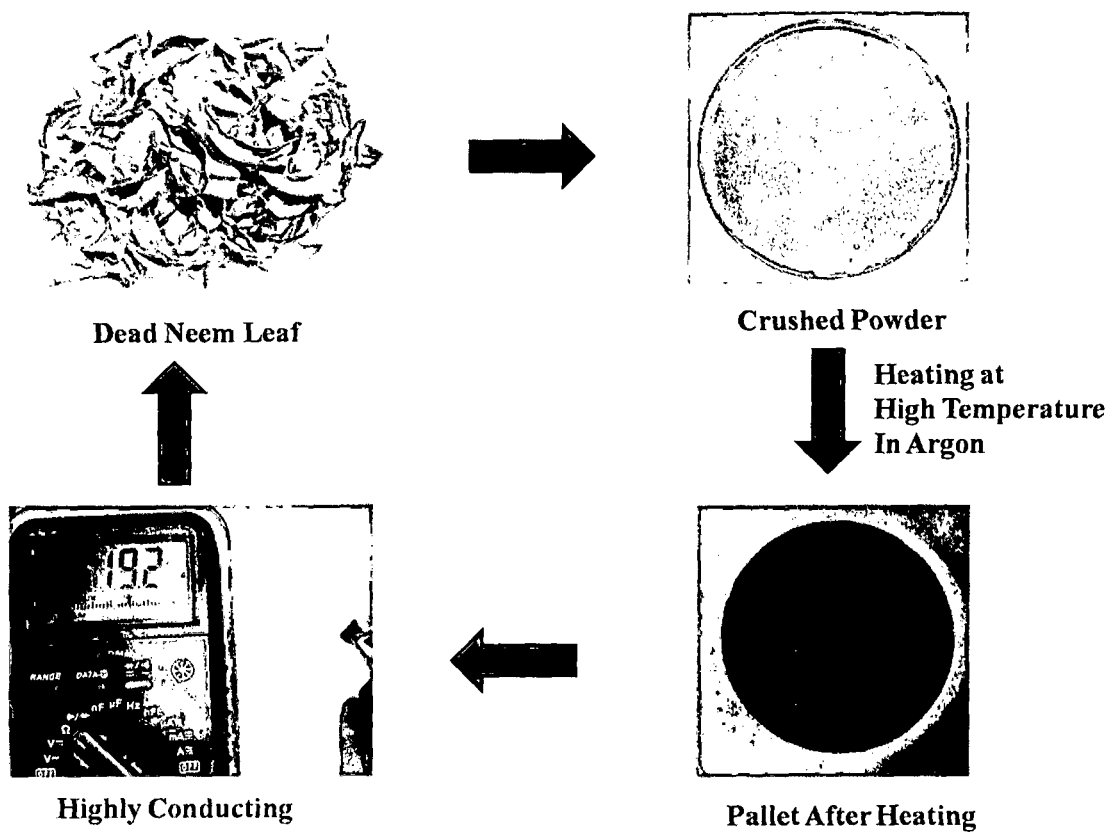
Figure: 2
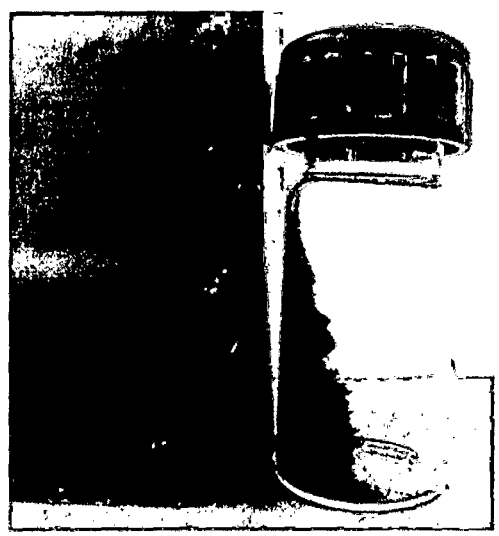

Figure: 3
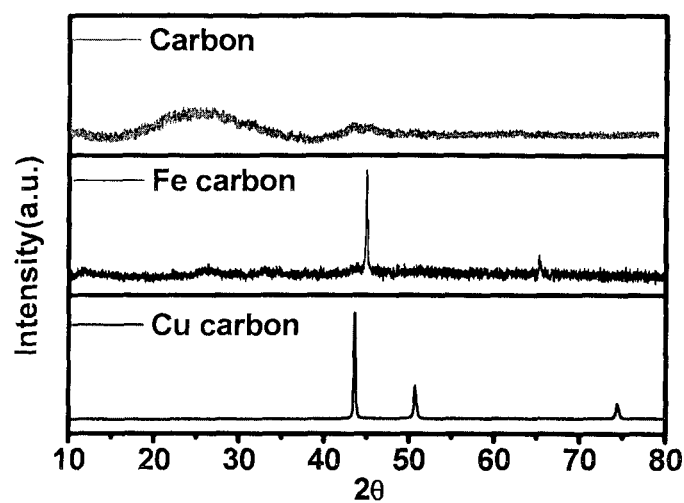
Figure: 4
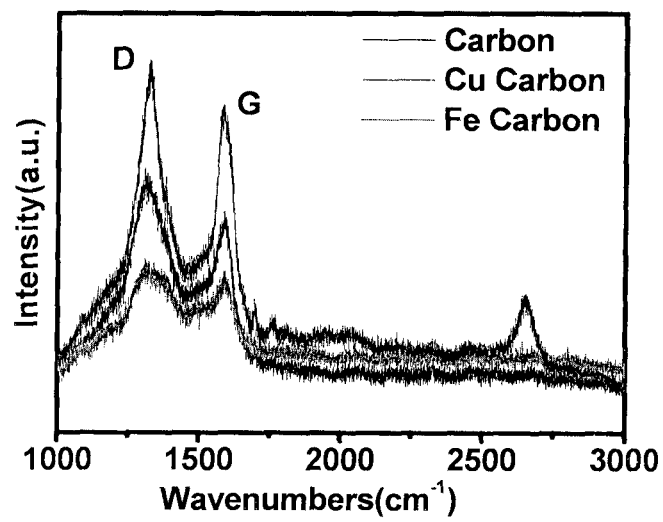

Figure: 5
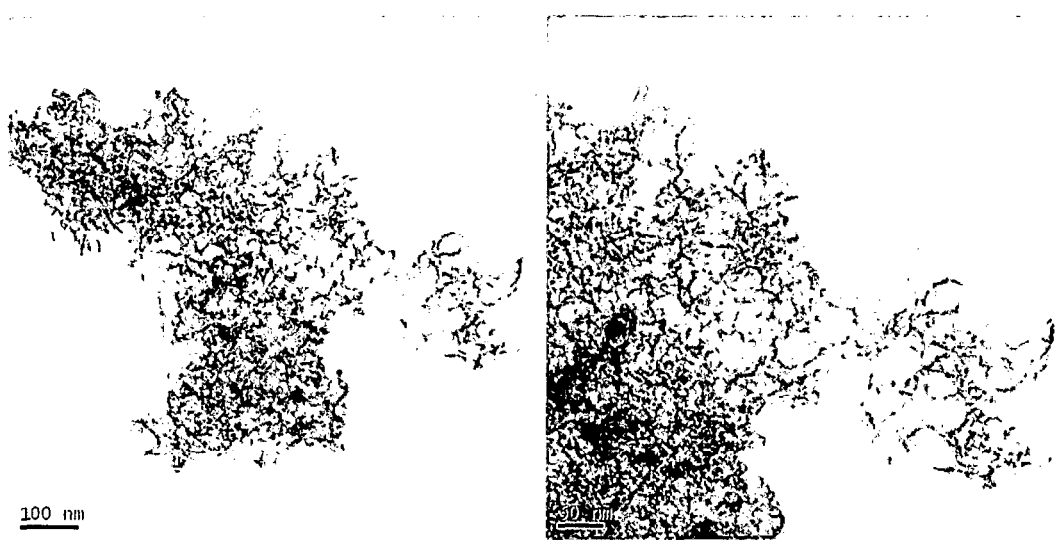
Figure 6
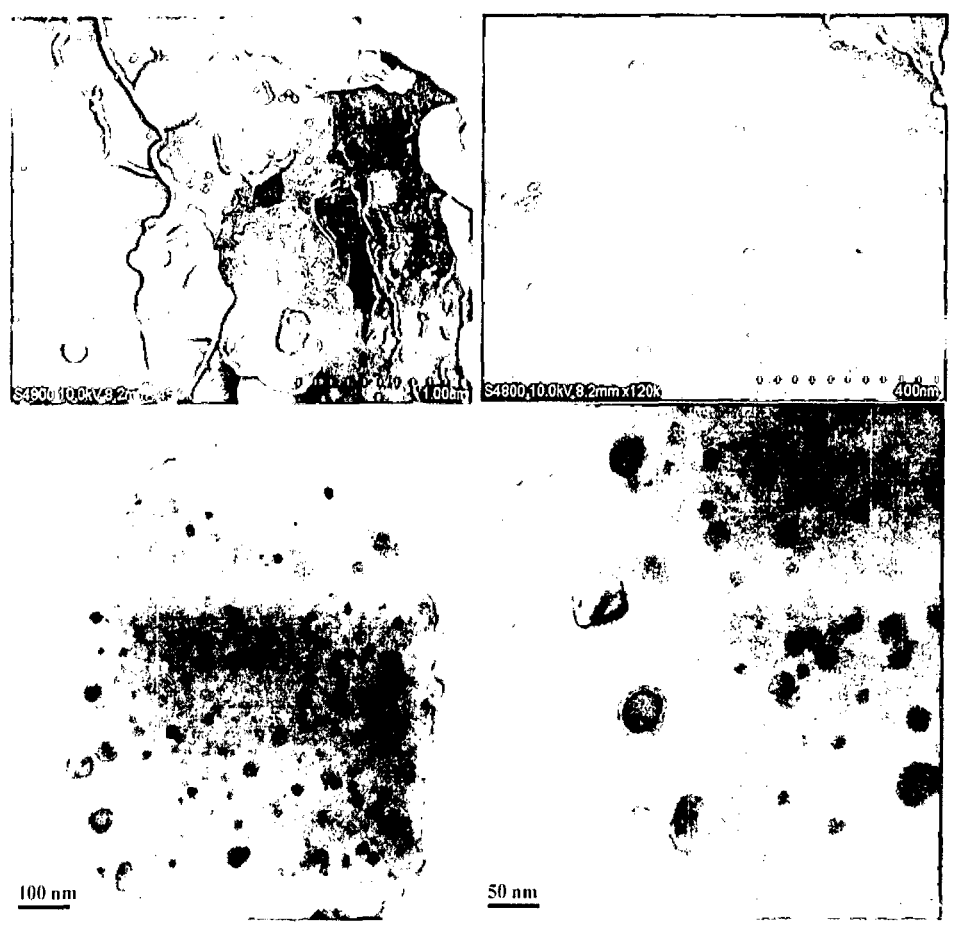

Figure : 7
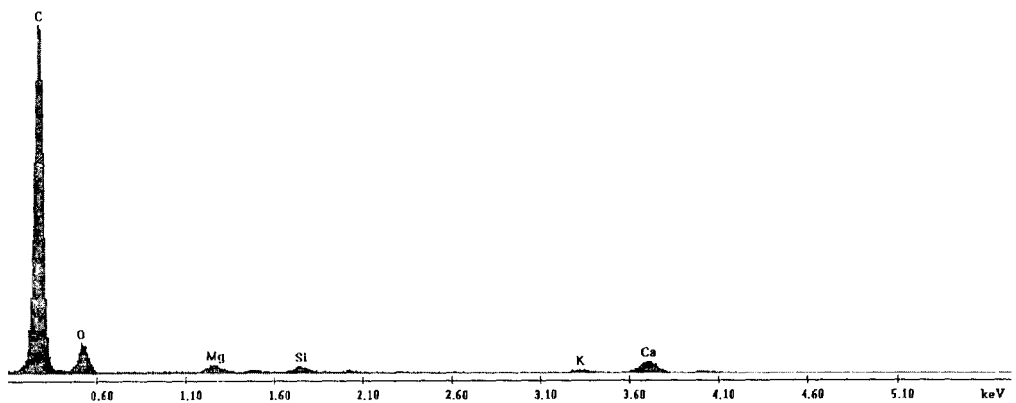
Figure : 8
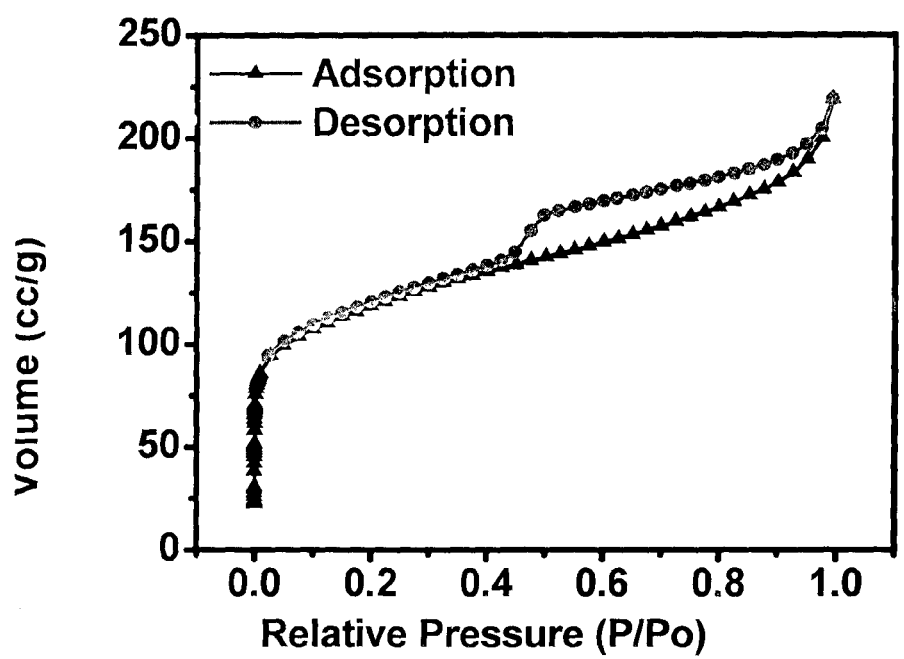

Figure: 9
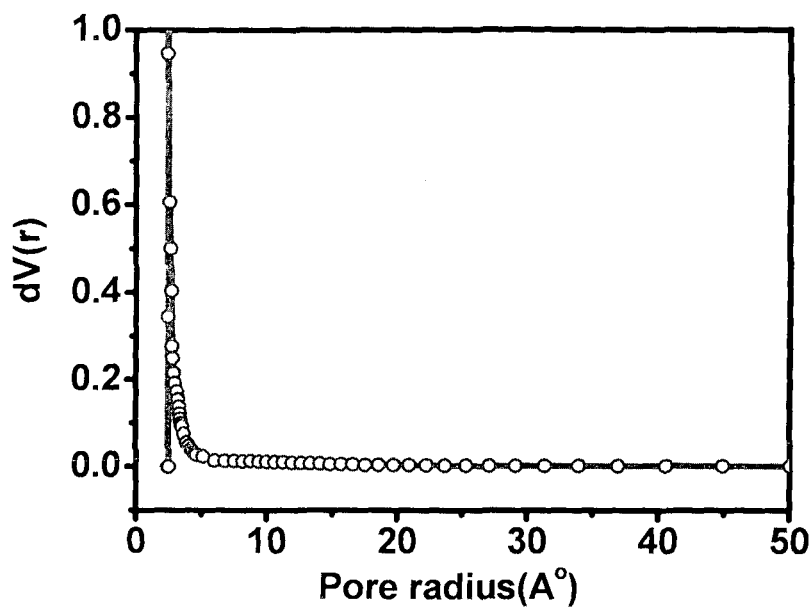
Figure: 10
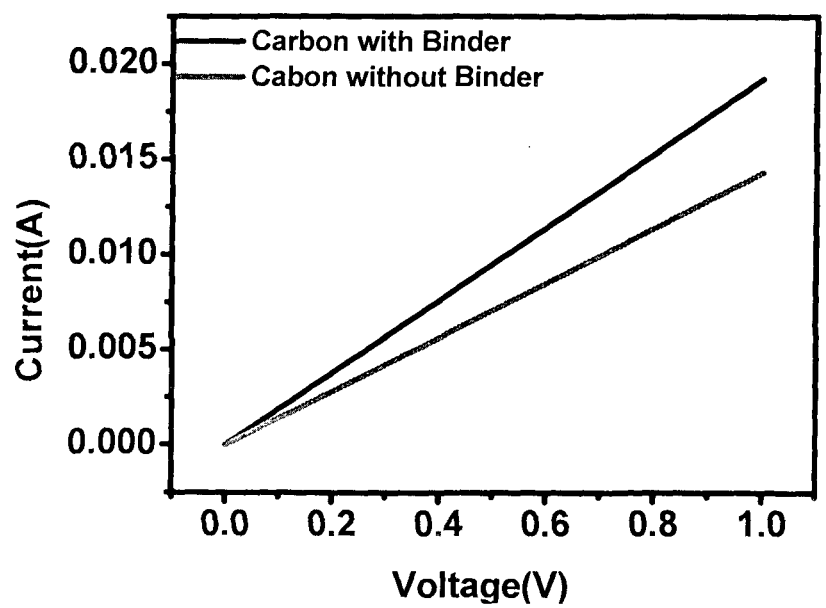

ELECTRONICALLY CONDUCTING CARBON AND CARBON-BASED MATERIAL BY PYROLYSIS OF DEAD LEAVES AND OTHER SIMILAR NATURAL WASTE

The following specification particularly describes the nature of this invention and the manner in which it is to be performed:

TECHNICAL FIELD OF INVENTION

The present invention provides electronically conducting carbon and carbon based composites and nanocomposites by pyrolysis of dead leaves and other similar natural waste material in argon gas flow at 1000° C. Particularly, present invention relates to synthesis of valuable functional carbon materials and their nanocomposites from different waste materials such as plant dead leaves and their use in several valuable applications.

BACKGROUND OF THE INVENTION

Waste management has always been a big problem in big cities. Fortunately through several environmental initiatives, communities have begun to separate dry and wet waste matter. The dry waste primarily comprises of natural dead leaves and similar waste as well as plastics. Dead leaves type of waste (including rice husk and other dry agricultural side products) is in fact available in plenty in woods as well as agricultural farms in villages. Most of this type of waste is a rich source of carbon but may contain other elements in different proportions depending on the source of the waste. Usually the waste from natural sources is just burnt producing ash and hazardous gaseous pollution products. There have been some initiatives to employ the ash but in most situations the use is in the form of passive fillers. If the natural waste and some of the man-made waste is harnessed to synthesize functional forms of carbon, one would get a high value-added product for diverse carbon based applications that have been growing rapidly in the past decade including super-capacitors, batteries, super-adsorbents for gases and toxins etc.

Carbon is the most naturally occurring abundant material present on earth exhibiting variety of molecular and structural forms such as graphite, diamond, nanotubes, graphene, fullerene, nano-diamonds, amorphous carbon, porous carbon etc. which have tremendous applications in various fields. Due to their high surface area, high mechanical strength, electrical, thermal and optical properties these forms have applications in super capacitor, battery, catalysis and other fields. Carbon has also been used in the form of nanocomposites with metals, metal oxides, nitrides, carbides, semiconductors etc. Researchers have tried several synthetic techniques to get high quality carbon such as carbonization of organic/polymeric precursors, autoclave synthesis from small halogenated aromatic molecules, chemical vapour deposition, excimer laser ablation of graphitic targets, sputtering/plasma methods, arc discharge methods, chemical methods (autoclave) etc. Apart from these techniques scientists have now started utilizing organic waste material such as food, agricultural wastes, and insects for the synthesis of carbon in grapheme.

The use of plant leaves for removal of water soluble dyes such as methylene blue, brilliant green, congo red and methylene blue is reported in the literature, such as K. G. Bhattacharyya in *Indian journal of chem Tech.* 12, 2005, 285-295 discloses utilization of a biosorbent based on *Azadirachta indica* (Neem) leaves for removal of water-soluble dyes. Article titled "Removal of Direct Red Dye Using Neem Leaf Litter" by Sivamani S et al. in *Helix Vol.* 1(2):129-133 (2012) reported the adsorption of Congo red (CR) onto carbon prepared from Neem leaf litter.

Further Neha Gupta in *Journal of the Taiwan Institute of Chemical Engineers* 43, (4), July 2012, 604-613 discloses, batch adsorption using ashoka (*Saraca asoca*) leaf powder (ALP), as an adsorbent for the removal of cationic dyes such as methylene blue, malachite green, rhodamine B and brilliant green from aqueous solution. Dharmendra Singh et al in *Inventi Rapid: Water & Environment Vol.* 2011, 3 discloses removal of color from aqueous solution by using low cost adsorbent *Azadirechta indica* Leaves".

The pyrolysis of neem (*Azadirachta indica*) and kikar (*Acacia arabica*) leaves at 400° C. in electric furnace for the preparation of carbon for fluoride removal is reported in *J. Environ Biol.* 2008 March; 29(2):227-32 by Kumar S, et al.

Moreover Bhardwaj S. in *Carbon Letters.* 8 (4) (2007) 285-291 discloses the synthesis of carbon materials by pyrolysis of Soap-nut seeds (*Sapindus mukorossi*), Jack Fruit seeds (*Artocarpus heterophyllus*), Date-seeds (*Phoenix dactylifera*), Neem seeds (*Azadirachta Indica*), Tea leaves (*Ehretia microphylla*), Bamboo stem (*Bambusa bambus*) and Coconut fiber (*Cocos nucifera*), without using any catalyst. Amongst the various precursors, carbon fibers obtained from Soap-nut seeds (*Sapindus mukorossi*) and Bamboo stem (*Bambusa bambus*), even after 100th cycles, showed the highest capacity of 130.29 mAh/g and 92.74 mAh/g respectively.

Further Bhardwaj et al. (Asian J. Exp. Sci. 22 2008; 89-93) have synthesised carbon nanomaterial from tea leaves as an anode in Lithium secondary batteries. However the leaves used in the citation are tea leaves which have high commercial value. The current invention is based on the synthesis of highly conducting carbon and its nanocomposites with metal and metal oxides from readily available dead leaves. The process of the citation involves boiling leaves for about 1 hr. then dried at 100° C. for 3 hrs, washing several times and finally pyrolysis.

While in the current invention the leaves are washed, dried directly and then pyrolysed. Hence the invention is advantageous as compared to methods of prior art as it uses dead leaves instead of any starting material of commercial value and provide shorter process for synthesis of carbon nanomaterials employing lesser energy.

The functional carbon is normally synthesized by different chemical methods following complex steps using man-made chemical precursors, such as synthesis of functional carbon (graphene) by chemical vapor deposition using different waste materials such as lignocellulosic biomass, food, insects as the source of precursor vapor phase materials. In present case functional carbon forms as the residue of the pyrolysis process when the vapor phase precursors are removed, making instant process distinctly different as compared to what is reported. Further instant invention makes it possible to synthesize various nanocomposites in bulk form by our process, which cannot be the case with the reported publication. Moreover there are no reports on the use of plant dead leaves as a source of conducting carbon.

In view of above the present inventor addresses the technical constraints associated with the existing process such as cumbersomeness, toxicity of reagents, limited application, energy and time consuming, environmentally hazardous by-products, low surface area and capacitance of derived carbon material, expensive starting material etc. To overcome such problems the inventors have developed source of carbon nanomaterial by industrially feasible, cost-effective technique prepared from cheap, non-toxic, bio waste material such as plant dead leaves, that affords carbon nanomaterial with significant properties. Further the present inventors have succeeded to solve the problem related to waste material and pollution by employing waste organic material for the synthesis of valuable functional and device-worthy carbon materials.

OBJECTS OF THE INVENTION

Main objective of the present invention is to provide highly functional carbon nanomaterial or carbon based nanocomposite having improved or significant property(s) which is synthesized from organic waste material such as plant dead leaves.

SUMMARY OF THE INVENTION

Accordingly, present invention provides a carbon nanomaterial characterized by the surface area in the range of 700 to 1400 m$^2$/g, electrical conductivity in the range of $2 \times 10^{-2}$ to $5 \times 10^2$ Scm$^{-1}$, capacitance in the range of 200-400 F/g and average pore diameter size in the range of 0.1 nm to 0.5 nm.

In an embodiment, present invention provides a process for synthesis of electronically conducting carbon nanomaterial as claimed in claim 1, wherein said process comprising the steps of:
 i. washing the dead leaves of plant with water followed by drying;
 ii. crushing the dried leaves to get fine powder of dead leaves;
 iii. pyrolysing the dead leaves powder at temperature in the rage of 600 to 1400° C. under argon atmosphere;
 iv. subsequently cooling the pyrolysed leaves at temperature in the rage of 20 to 30° C. to obtain electronically conducting carbon nanomaterial having high surface area, specific capacitance and conductivity.

In another embodiment of the present invention, the dead leaves are selected from the plant Neem (*Azadirachta indica*) and Ashoka (*Saraca asoca*).

In yet another embodiment of the present invention, in step (b) the dead leaf powder is optionally mixed with binder in the ratio ranging between 10:1 to 10:0.5 (w/w).

In yet another embodiment of the present invention, the conductivity value for the carbon synthesized with binder is in the range of $4 \times 10^{-2}$ to $8 \times 10^{-2}$ Scm$^{-1}$.

In yet another embodiment of the present invention, the dead leaf powder is optionally mixed with metal powder and binder in the ratio of ranging between 5.5 to 1 to 5:5:0.5 (w/w) respectively, to obtain carbon based metal nanocomposite.

In yet another embodiment of the present invention, metal used is selected from Fe and Cu or oxides thereof.

In yet another embodiment of the present invention, the binder used is selected from the group consisting of cellulose, methyl cellulose, gelatine, starch, polyvinylpyrrolidone (PVP) and polyethylene glycol (PEG) preferably polyvinylpyrrolidone (PVP).

In yet another embodiment of the present invention, said nanomaterial is useful as catalyst, super-adsorbents for toxic chemicals and dye remover; in high value added products to applications such as super-capacitor, super-adsorbent, battery, catalysis.

BRIEF DESCRIPTION OF THE FIGURES

FIG. 1 depicts the process pathway for the synthesis of conducting carbon from dead leaves.

FIG. 2 depicts magnetic Fe-carbon nano-composites attracted towards magnet, wherein complete powder is attracted towards magnet which signifies the formation of a composite, and not a physical mixture of Fe and carbon.

FIG. 3 depicts XRD Spectra for carbon, Fe-carbon and Cu-carbon, wherein only carbon two broad peaks are present around $2\theta=26°$ and $44°$ corresponding to graphitic form of carbon. In the case of Fe and Cu based composites the observed strong peaks correspond to metallic Cu and Fe. The carbon peaks are relatively small and can show up in the tog scale.

FIG. 4 depicts Raman Spectra of carbon, Fe-carbon and Cu-carbon, wherein the peak present around 1300 cm$^{-1}$ corresponds to the D band and the peak at 1590 cm$^{-1}$ corresponds to the G band of carbon. In the case of Cu and Fe carbon composites both D and G bands are slightly shifted towards higher wave numbers. This shift is again due to the strain involved during the formation of the composites.

FIG. 5 depicts HR-TEM Images of porous carbon, wherein porous sheet like structures correspond to graphitic-carbon-like structures.

FIG. 6 depicts (a) FE-SEM images of Cu-carbon (b) FE-SEM images of Fe-carbon (c) HR-TEM images of Cu-carbon (d) HR-TEM images of Fe-carbon. Further the images show a uniform dispersion of Cu and Fe particles embedded in the carbon matrix.

FIG. 7 depicts EDAX Image of carbon from Neem leaf powder, wherein the synthesized carbon shows majority percentage and oxygen along with a few percent of Mg, Si, K and Ca which come from the oxide residues of Neem leaf.

FIG. 8 depicts BET adsorption isotherm of carbon, which show a Type-II adsorption desorption characteristics having mesoporous structures. The surface area is found to be 382 m$^2$/g and the average pore diameter is measured 0.5 nm.

FIG. 9 depicts pore distribution plot of carbon, which shows a uniform pore distribution of carbon with or without binder. Further it represents the surface area 1231 m$^2$/g for the case of carbon synthesized without binder which is considerably high as compared to the case with binder. The pore radius is again found to be 0.5 nm.

FIG. 10 depicts conductivity measurements of carbon synthesized with binder and without binder which shows the Current and Voltage plot (I-V Plot) of carbon synthesized with and without binder case respectively. The conductivity value for the carbon synthesized with binder is $5 \times 10^{-2}$ Scm$^{-1}$ and without binder is $3.5 \times 10^{-2}$ Scm$^{-1}$. The high conducting nature of carbon is also observed in the case of carbon obtained by pyrolysis of Ashoka plant dead leaves by the instant process.

DETAILED DESCRIPTION OF THE INVENTION

Figure 11:
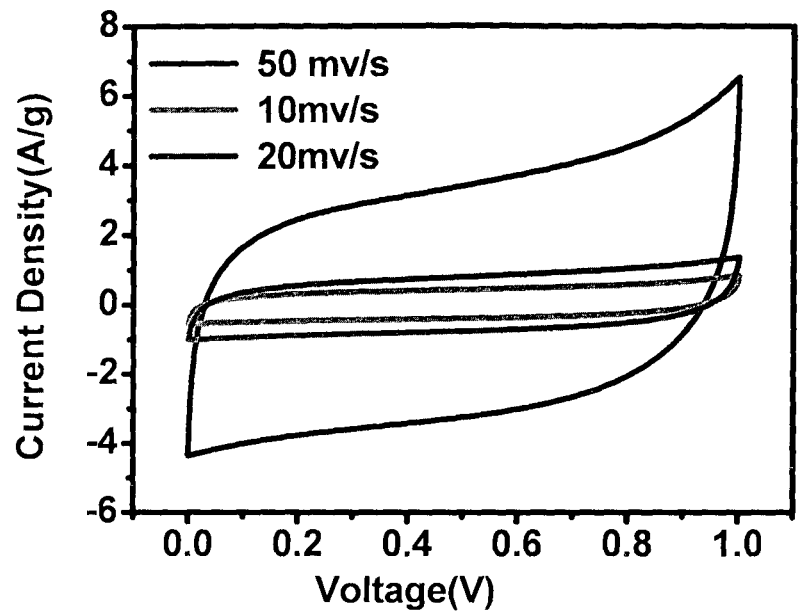
FIG. 11 depicts cyclic voltammetry measurements of carbon without binder cases at 50 mv/s scan rate, which represents an ideal supercapacitor. Also rectangular nature represents a perfect double layer formation.
Figure 12:
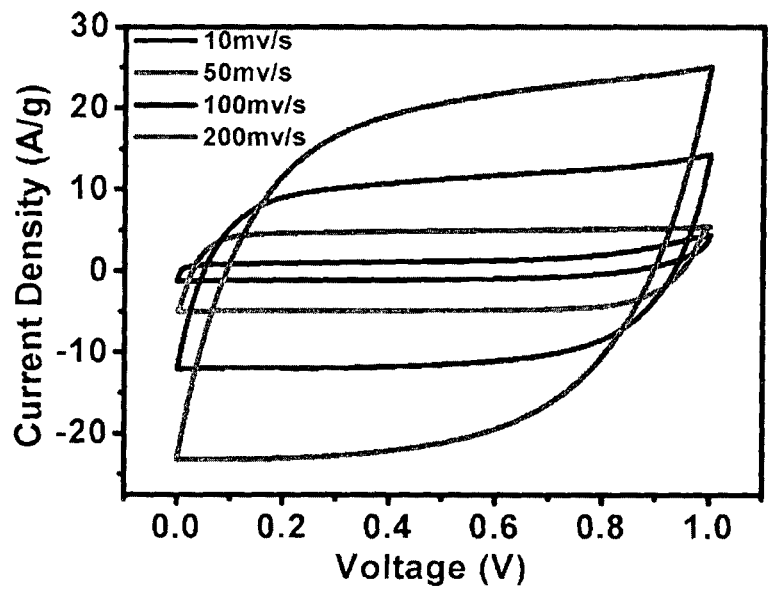
FIG. 12 depicts Cyclic Voltammetry measurements of carbon without binder cases at different scan rates.
Figure 13:
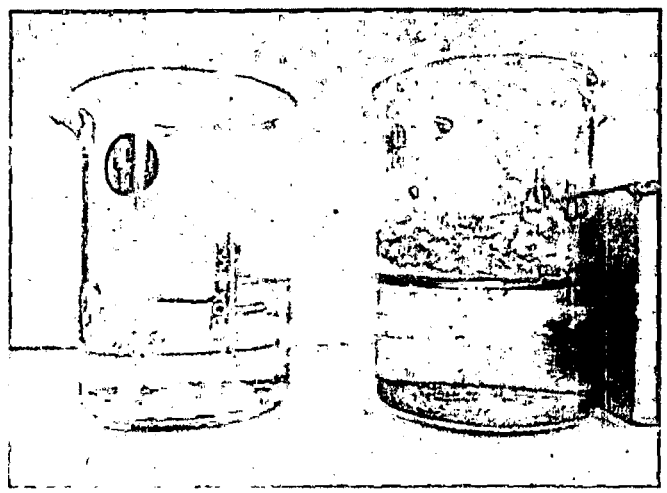
FIG. 13 depicts methylene blue dye removal by Fe-carbon composite.
Figure 14:
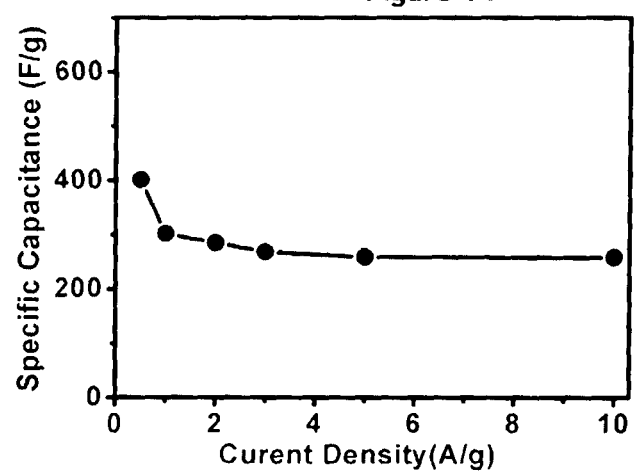
FIG. 14 depicts the plot of specific capacitance with different current densities which shows even at very high current density (10 A/g) the specific capacitance is still high as 290 F/g.
Figure 15:
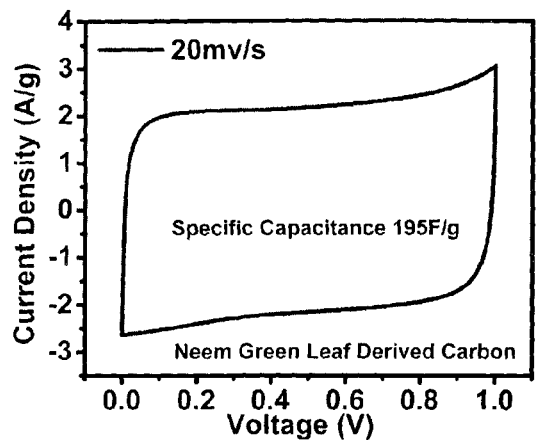
FIG. 15 depicts CV curve for the carbon synthesized from fresh green leaves which shows a specific capacitance of 195 F/g at a can rate of 20 mv/s. This value is lower than the carbon synthesized from the Neem dead leaves.
Figure 16:
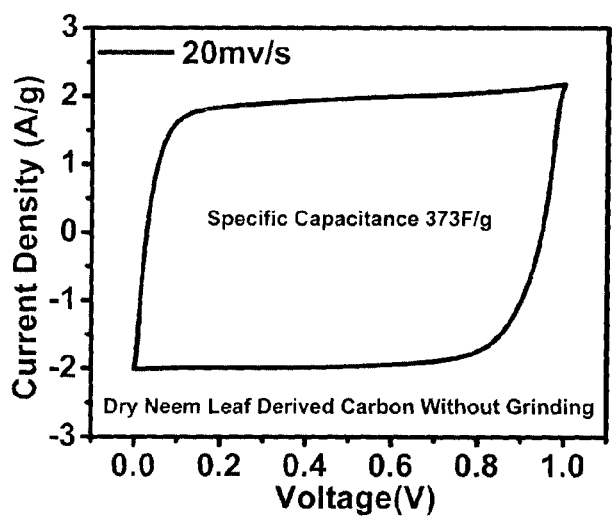
FIG. 16 depicts CV curve of Neem dry leaf without grinding at 20 mv/s in 1M $H_2SO_4$. The specific capacitance was calculated to be 373 F/g.
Figure 17:
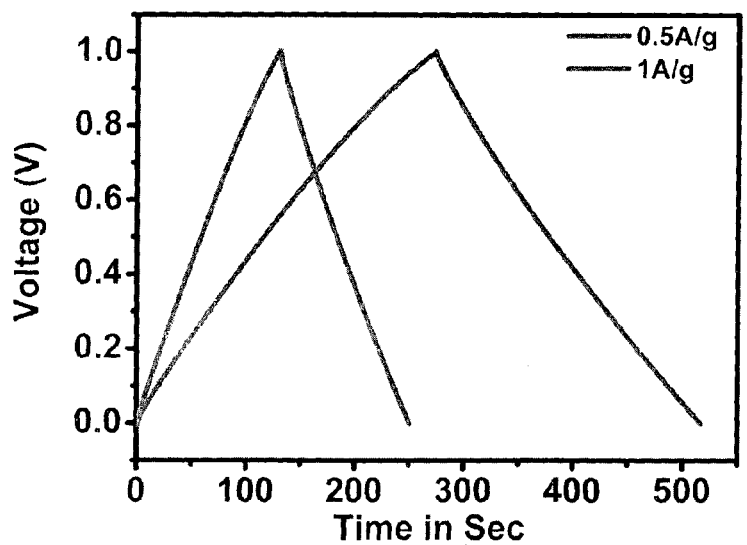
FIG. 17 depicts charge Discharge curve of Ashoka leaf derived carbon at 1 A/g and 0.5 A/g with 1M $H_2SO_4$. From the charge discharge curve the specific capacitance of Ashoka leaf derived carbon was calculated to be 250 F/g at a current density of 0.5 A/g which is lower than the Neem leaf carbon.
Figure 18:
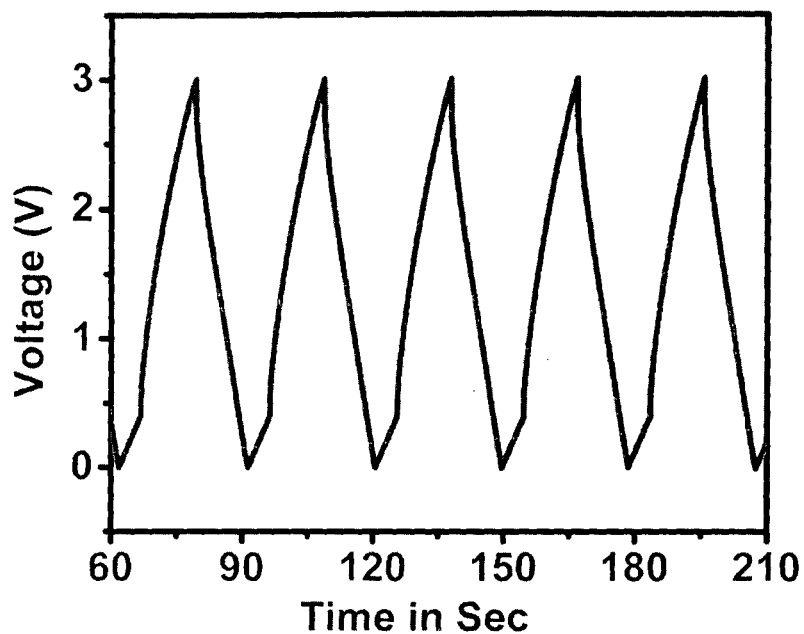
FIG. 18 depicts charge discharge data of Ashoka leaf derived carbon at 2 A/g current density in organic electrolyte. From the above curve the specific capacitance of Ashoka leaf derived carbon is calculated to be 21 F/g which is less than the neem leaf derived carbon.
Figure 19:
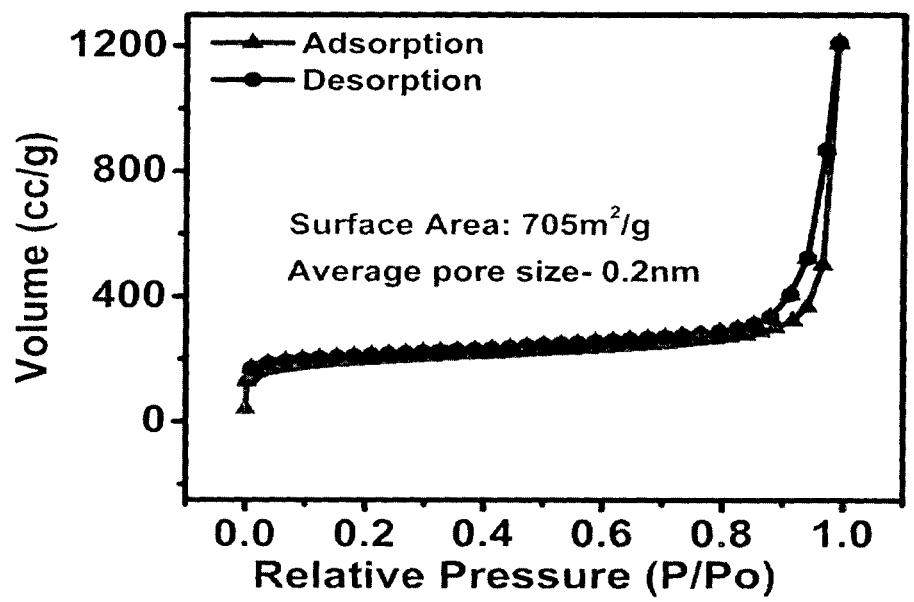
FIG. 19 depicts BET surface area measurements of Ashoka leaf derived carbon. It shows a surface area of 705 m2/g and average pore radius of 0.2 nm.
Figure 20:
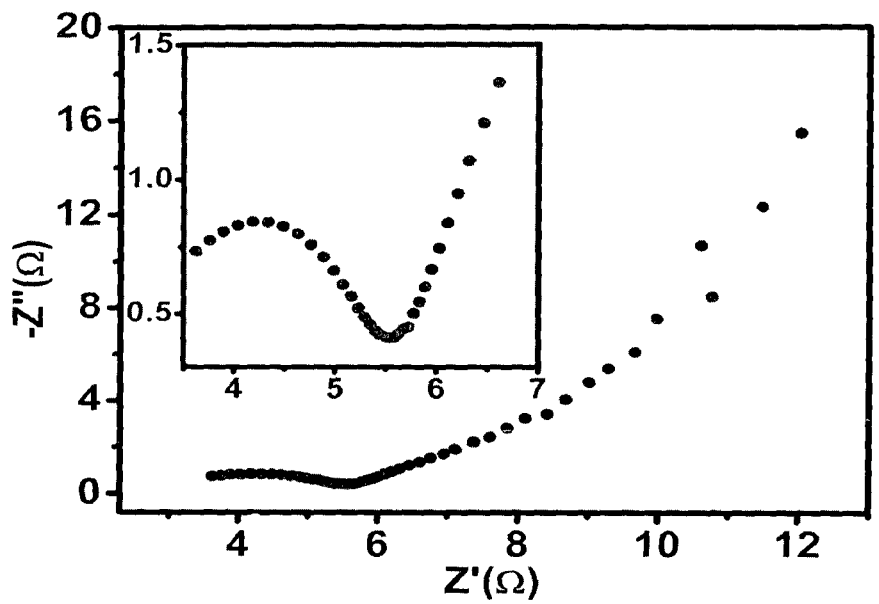
FIG. 20 depicts Nyquist plot for carbon carbon electrode in 1M LiPF6 in EC: DEC (organic) [inset shows magnified high frequency region].
Figure 21:
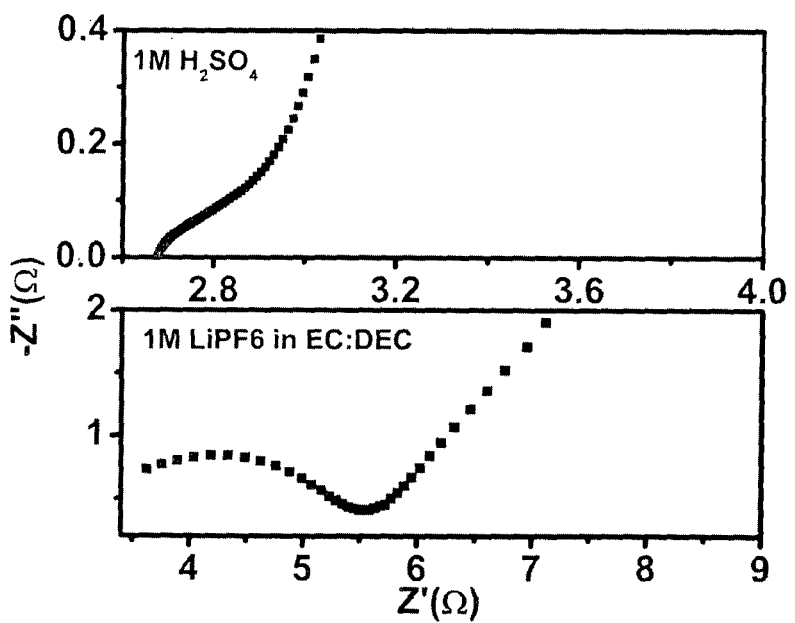
FIG. 21 depicts comparison of Nyquist plot for carbon electrode in 1M $H_2SO_4$ (aqueous) and 1M LiPF6 in EC: DEC (organic).

In the present specification, the following words and phrases are generally intended to have the meanings as set forth below, except to the extent that the context in which they are used indicate otherwise.

The term "carbon material" can also referred as "carbon particles" "carbon nanomaterial", "carbon nanoparticle" "carbon composite" or "carbon powder".

The present invention provides carbon nanomaterial having high surface area, electrical conductivity and capacitance obtained by pyrolysis of plant dead leaves. The dead leaves are fallen leaves or dry leaves of plant selected from Neem (*Azadirachta indica*) and Ashoka (*Saraca asoca*), wherein the dead leaves are individually selected from the plant Neem (*Azadirachta indica*) or Ashoka (*Saraca asoca*) or from both plants. Dead leaves of both the plants were collected from the compartment of NCL (National Chemical Laboratory), Dr. Homi Bhabha Road, Pune-411 008, India.

Present invention provides process for synthesis of carbon nanomaterial by pyrolysis of plant dead leaves, particularly dead leaves of Neem (*Azadirachta indica*) and Ashoka (*Saraca asoca*), wherein the derived carbon nanomaterial having high surface area, electrical conductivity and capacitance which is useful in high value added product applications such as super-capacitor, super-adsorbent, battery, catalysis, dye removal water purification etc.

In another aspect, the invention relates to synthesis of functional carbon material by pyrolysis of dead leaves in presence of binder.

In another aspect, the invention deals with the synthesis of carbon based metal nano-composites from the dead leaves which can be useful in the applications such as catalysis and super-adsorbent for toxic chemicals, dye removal.

The present invention provides carbon nanomaterial/particles having high surface area in the range of 700 to 1400 $m^2/g$; electrical conductivity in the range of $2\times10^{-2}$ to $5\times10^{-2}$ $Scm^{-1}$; capacitance in the range of 200-400 F/g and average pore diameter size in the range of 0.1 nm to 0.5 nm obtained by pyrolysis of plant dead leaves.

The process for the synthesis of functional carbon nanomaterial by pyrolysis of dead leaves of Neem (*Azadirachta indica*) and Ashoka (*Saraca asoca*) comprising the steps of:

a) washing the dead leaves of plant with water followed by drying;

b) crushing the dried leaves to get fine powder of dead leaves;

c) decomposing the dead leaves powder at high temperature (1000° C.±400° C.) under argon atmosphere; subsequently cooling at room temperature to obtain nanoparticles of carbon having high surface area and capacitance.

According to the process, the decomposition or pyrolysis of crushed dead leaves is carried out on alumina plate or crucible, wherein the dead leaves powder is heated at temperature range 600° C. to 1400° C. with heating rate in the range of 8-20° C. per minute wherein the crushing or grounding of dead leaves can be performed by known techniques by using crusher, mortar and pestle and like thereof.

It was demonstrated that the dead leaves without crushing or grinding i.e. as such dead leaves can also be used for the synthesis of carbon material via pyrolysis to give improved specific capacitance.

The synthesized carbon material containing reduced amount of the impurities which come from the oxide residues of plant leaf, wherein the impurities comprising of oxygen and few percent of Mg, Si, K and Ca, such impurities do not interfere the carbon nanomaterial conducting properties.

The average pore size of derived carbon particles is measured in the range of 0.1 nm to 0.5 nm, whereas the surface area of the carbon nanomaterial/nanoparticle is measured in the range of 700 to 1400 $m^2/g$, particularly the surface area of the carbon powder derived from the dead leaves of Neem (*Azadirachta indica*) was observed in the range of 1000-1400 $m^2/g$, whereas surface area of the carbon powder derived from Ashoka (*Saraca asoca*) is in the range of 700-1000 $m^2/g$.

The specific capacitance of carbon material derived from dead leaves is evaluated in suitable aqueous electrolyte such as 1M $H_2SO_4$, or organic electrolyte such as ethylene and diethyl carbonates (EC-DEC) solutions of $LiAsF_6$, $LiClO_4$, $LiBF_4$ and $LiPF_6$; wherein the specific capacitance of derived carbon nanoparticles is measured in the range of 200-400 F/g.

In accordance with the specific capacitance, the carbon material derived from dead leaves of Neem exhibits nearly 290 F/g, and carbon particles derived from dead leaves of ashoka in aqueous electrolyte was measured about 250 F/g. Also the inventors have optionally derived carbon material from the dead or dry leaves of Neem without grinding, where the specific capacitance is evaluated nearly 373 F/g.

Alternatively, fresh green neem leaves pulp can also be subjected to the process according to the invention to obtain conducting carbon material, where the conductance is measured nearly 195 F/g. The chemical composition of fresh neem leaves is depicted in table 1.

The carbon material derived from dead leaves of plants in acidic medium preferably sulphuric acid with molar concentration 0.5M to 2M, particularly in presence of 1M sulphuric acid which shows high energy density i.e. more than 55.0 $WhKg^{-1}$ and power density≥10 $kWKg^{-1}$ which is comparatively higher than the other source of carbon materials, the comparison of energy density and power density of various carbon materials with dead leaf derived carbon is represented in Table 2.

The invention provides synthesis of carbon nanomaterial from dead leaves of Neem (*Azadirachta indica*) and Ashoka (*Saraca asoca*) in presence of binder; particularly the dead leaf powder is mixed with binder in the ratio of 10:0.5 (w/w) wherein the binder is selected from the group consisting of cellulose, methyl cellulose, gelatine, starch, polyvinylpyrrolidone (PVP) and polyethylene glycol (PEG); preferably polyvinylpyrrolidone (PVP).

Accordingly, the dead leaf powder was mixed with a PVP (poly vinyl pyrollidone) binder and formed as a pellet. The pellet was then placed on alumina plate and subjected to high temperature pyrolysis 1000° C. (±400° C.) under inert atmosphere for 2-10 hours at a heating rate of 5-15° C. per minute. The duration at the peak temperature was 1-10 hrs. The inert atmosphere is preferably argon.

The invention also provides evaluation of capacitance of carbon synthesized by both these cases, (with PVP binder and without binder) by means of carbon loaded electrodes in presence of alcohol and 1% Polytetrafluoroethylene (PTFE) solution under vacuum condition.

It was observed that for the carbon synthesized with binder a capacitance value of 120 F/g was realized at the scan rate of 50 mv/s, whereas for the carbon synthesized without binder the capacitance was found to have increased to 250 F/g (50 mv/s scan rate).

The conductivity value for the carbon synthesized from Neem leaves with binder is in the range of $4 \times 10^{-2}$ to $8 \times 10^{-2}$ $Scm^-$ and without binder is in the range of $2 \times 10^2$ to $5 \times 10^{-2}$ $Scm^-$.

The invention provides carbon based metal nanocomposite from the dead leaves, wherein the dead leaves of neem or ashoka or both are mixed with a metal powder and binder.

The crushed dead leaves are mixed with metal followed by thoroughly blending with binder and made into pellets, subsequently the pellets are pyrolysed/decomposed at 1000° C. (±200° C.) in an inert atmosphere for 2-10 hours at a heating rate of 5-15° C. per minute.

The pallet can be prepared by mixing dead leaf powder and metal powder and binder in the ratio of 5:5:0.5 (w/w) which is further subjected to pyrolysis at high temperature.

The metal used in the nanocomposites is selected from the group consisting of Fe, Co, Cu, Zn, Al, Ni, Ti, Ag, Au, Pd, Pt like thereof or oxides, hydroxides thereof, preferably metal is Fe and Cu or oxides thereof; whereas the binder is particularly PVP.

It is noteworthy that the carbon nano-composites synthesized by instant process can be useful to generate carbon based application-worthy forms by addition of other molecules, polymers, metals, semiconductors, oxides or waste such as ash, fly ash and such like.

The Fe-carbon nanocomposite synthesized by the instant process was tested for dye removal wherein Fe-carbon composite was added to $10^{-5}$ M methylene blue solution with stirring where the blue colour of methylene blue immediately disappeared, followed by separating Fe-carbon composites by means of magnet to get transparent solution. Further the adsorbed methylene blue solution can be recovered by putting the Fe-carbon composites into ethanol. The dye molecules immediately come out from the Fe-carbon composites.

The carbon composite and carbon based metal nanocomposite synthesized according to the instant process exhibit high value added products to many application but not limited to applications such as super-capacitor, super-adsorbents for toxic chemicals and dye remover, battery, catalysis, water purification and like thereof.

According to the invention the derived carbon composites and carbon based metal nanocomposites are characterized by using XRD, Raman spectra, HR-TEM, FE-SEM, EDAX, BET nitrogen adsorption isotherm, Current and Voltage plot.

The chemical composition of fresh neem leaves having more water content (>50.0%) and the comparison of carbon derives from dead leaves and other known material is represented in herein below table 1 and table 2 respectively.

TABLE 1

Chemical composition of Fresh Neem Leaves

| | |
|---|---|
| Moisture | 59.4% |
| Proteins | 7.1% |
| Fat | 1.0% |
| Fibre | 6.2% |
| Carbohydrates | 22.9% |
| Minerals | 3.4% |
| Vitamin C | 218 Mg/100 g |
| Glutamic acid | 73.30 Mg/100 g |

TABLE 2

Comparison of energy density and power density of various carbon materials with dead leaf derived carbon

| Materials | Medium | Max energy Density | Max Power Density |
|---|---|---|---|
| Activated carbon from waste coffee beans | 1M $H_2SO_4$ | 20 $WhKg^{-1}$ | — |
| Carbon from sea weeds | 1M $H_2SO_4$ | 19.5 $WhKg^{-1}$ | — |
| Activated Carbon from Sugarcane bagasse | 1M $H_2SO_4$ | 10 $WhKg^{-1}$ | — |
| Binder free RGO-CNT film | 1M $H_2SO_4$ | 59.9 $WhKg^{-1}$ | 250 $WKg^{-1}$ |
| Ultrathin Graphene film | 2M KCL | 15.4 $WhKg^{-1}$ | 55 $WKg^{-1}$ |
| Graphene-CNT | 0.5M $H_2SO_4$ | 21.74 $WhKg^{-1}$ | 78.29 $kWKg^{-1}$ |
| Carbon derived from Dead Leaves | 1M $H_2SO_4$ | 55.5 $WhKg^{-1}$ | 10 $kWKg^{-1}$ |

EXAMPLES

The following examples are given by way of illustration and therefore should not be construed to limit the scope of the present invention.

Example 1

Synthesis of Carbon Pellet with Binder 10 g of dead leaf powder was mixed thoroughly with 500 mg PVP (poly vinyl pyrollidone) binder and then pellet sample was made. The pellet was placed on an alumina plate and was subjected to high temperature pyrolysis at 1000° C. under argon atmosphere for 5 hr at a heating rate of 10° C. per minute. The duration at the peak temperature was 3 hrs.

Example 2

Synthesis of Fe, Carbon Nanocomposites 5 g of leaf powder and 5 g of Fe metal were mixed thoroughly with 500 mg PVP to make a pellet and the same was subjected to high temperature pyrolysis as mentioned in example 1.

Example 3

Synthesis of Carbon Material 10 g of dead leaf powder was heated in an alumina crucible at 1000° C. under argon atmosphere for 5 hr at a heating rate of 10° C. per minute and cooled to room temperature at natural rate to obtain black powders.

Example 4

Cyclic Voltammetry Measurements

Preparation of Electrodes

All the electrodes were prepared on Glassy carbon. Two glassy carbon substrates were used for each measurement. 6 mg of carbon was dispersed in 6 ml isopropanol and 200 µl of 1% PTFE solution was added to it. After proper dispersion this was drop-cast slowly on the glassy carbon till the loading was 1 mg. After making the electrodes they were dried in vacuum for 24 hrs at 60° C. Carbon synthesized by both these cases, (with PVP binder and without binder) were studied for super capacitor measurements.

Testing of Electrodes

All the Cyclic Voltammetry experiments were carried out using Auto Lab instrument in a potential window of 0-1V and in 0.5M $H_2SO_4$ electrolyte. Measurements were taken at the scan rates of 10, 20 and 50 mv/s. The results are shown in FIG. 10. It was observed that for the carbon synthesized with binder a capacitance value of 80 F/g was realized at the scan rate of 50 mv/s, whereas for the carbon synthesized without binder the capacitance was found to have increased to 120 F/g (50 mv/s scan rate).

ADVANTAGES OF THE INVENTION

Invention provides efficient, cost-effective process for preparation of functional carbon nanoparticles by simple pyrolysis of biologically waste material.

The process also involves following significant advantages such as a) Effective use of dead leaves,
b) Avoid environmental pollution,
c) Value-added carbon product from waste matter,
d) Carbon produces useful in various applications such as supercapacitors, superabsorbent, battery and catalysis,
e) Solution to waste management and control of pollutants.

The invention claimed is:

1. A carbon nanomaterial characterized by a surface area in the range of 700 to 1400 $m^2/g$, electrical conductivity in the range of $2\times10^{-2}$ to $5\times10^{-2}$ $Scm^{-1}$, capacitance in the range of 200-400 F/g and average pore diameter size in the range of 0.1 nm to 0.5 nm.

2. A process for synthesis of electronically conducting carbon nanomaterial as claimed in claim 1, wherein said process comprises the steps of:
   a) washing dead leaves of a plant with water followed by drying;
   b) crushing the dried leaves to obtain a fine powder of dead leaves;
   c) pyrolysing the dead leaves powder at a temperature in the range of 600 to 1400° C. under an argon atmosphere;
   d) subsequently cooling the pyrolysed leaves at a temperature in the range of 20 to 30° C. to obtain electronically conducting carbon nanomaterial having a high surface area, specific capacitance and conductivity.

3. The process according to claim 2, wherein the dead leaves are selected from the plant Neem (*Azadirachta indica*) and Ashoka (*Saraca asoca*).

4. The process according to claim 2, wherein said electronically conducting carbon nanomaterial exhibits a surface area in the range of 700 to 1400 $m^2/g$, electrical conductivity in the range of $2\times10^{-2}$ to $5\times10^{-2}$ $Scm^{-1}$, capacitance in the range of 200-400 F/g and average pore diameter size in the range of 0.1 nm to 0.5 nm.

5. The process according to claim 2, wherein in step (b) the dead leaf powder is optionally mixed with binder in a ratio ranging between 10:1 to 10:0.5 (w/w).

6. The process according to claim 5, wherein the conductivity value for the carbon synthesized with binder is in the range of $4\times10^{-2}$ to $8\times10^{-2}$ $Scm^{-1}$.

7. The process according to claim 2, wherein in step (b) the dead leaf powder is optionally mixed with metal powder and binder in a ratio ranging between 5.5 to 1 to 5:5:0.5 (w/w) respectively, to obtain carbon based metal nanocomposite.

8. The process according to claim 7, wherein the metal is selected from Fe and Cu or oxides thereof.

9. The process according to claim 5, wherein the binder used is selected from the group consisting of cellulose, methyl cellulose, gelatine, starch, polyvinylpyrrolidone (PVP) and polyethylene glycol (PEG).

10. The carbon nanomaterial as claimed in claim 1, wherein said nanomaterial is useful as a catalyst; as a super adsorbent for toxic chemicals and dye removers; in supercapacitors; or in batteries.

11. The process according to claim 7, wherein the binder is selected from the group consisting of cellulose, methyl cellulose, gelatine, starch, polyvinylpyrrolidone (PVP) and polyethylene glycol (PEG).

* * * * *